(12) United States Patent
Baba

(10) Patent No.: US 7,298,683 B2
(45) Date of Patent: Nov. 20, 2007

(54) OPTICAL INFORMATION RECORDING/REPRODUCING APPARATUS WITH MECHANISM FOR CORRECTING SPHERICAL ABERRATION AND METHOD USING SAME

(75) Inventor: Hisatoshi Baba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 10/998,645

(22) Filed: Nov. 30, 2004

(65) Prior Publication Data

US 2005/0122878 A1 Jun. 9, 2005

(30) Foreign Application Priority Data

Dec. 9, 2003 (JP) .............................. 2003-410529

(51) Int. Cl.
G11B 7/00 (2006.01)
(52) U.S. Cl. ............................ 369/59.22; 369/124.11
(58) Field of Classification Search .................. None
See application file for complete search history.

(56) References Cited

U.S. PATENT DOCUMENTS

| | | | | |
|---|---|---|---|---|
| 4,841,407 A | | 6/1989 | Baba et al. .................. 361/146 |
| 4,972,395 A | | 11/1990 | Baba ............................ 369/13 |
| 5,060,088 A | * | 10/1991 | Dolivo et al. .................. 360/46 |
| 5,260,923 A | | 11/1993 | Baba ........................ 369/44.28 |
| 5,347,503 A | | 9/1994 | Koyama et al. ......... 369/44.32 |
| 5,404,346 A | | 4/1995 | Koyama et al. ......... 369/44.32 |
| 5,563,864 A | * | 10/1996 | Kobayashi et al. ....... 369/59.22 |
| 5,699,330 A | | 12/1997 | Ogino et al. .................... 369/32 |
| 5,748,583 A | | 5/1998 | Baba ........................ 369/44.28 |
| 5,796,687 A | | 8/1998 | Baba ........................ 369/44.29 |
| 6,671,244 B2 | * | 12/2003 | Honma ...................... 369/59.22 |
| 6,690,635 B2 | * | 2/2004 | Tonami .................... 369/59.22 |
| 6,937,551 B2 | * | 8/2005 | Miyashita et al. ........ 369/53.16 |
| 7,079,467 B2 | * | 7/2006 | Indukumar et al. ...... 369/59.22 |
| 2003/0107961 A1 | | 6/2003 | Yasuda et al. ........... 369/44.27 |

FOREIGN PATENT DOCUMENTS

JP 2001-14804 A 1/2001
JP 2003-233917 A 8/2003

OTHER PUBLICATIONS

Perkins et al., "A Window-Margin-Like Procedure for Evaluating PRML Channel Performance," IEEE Transactions on Magnetics, vol. 31, No. 2, pp. 1109-1114, Mar. 1995.

* cited by examiner

Primary Examiner—Thang V. Tran
Assistant Examiner—Peter Vincent Agustin
(74) Attorney, Agent, or Firm—Fitzpatrick, Cella, Harper & Scinto

(57) ABSTRACT

An optical information recording/reproducing apparatus is provided that condenses a light flux from a light source on an optical recording medium and effects recording/reproduction and comprises a light source; an objective lens; a spherical aberration generating mechanism; a sensor for receiving light reflected by an optical recording medium and converting the light into an electric signal; an equalization filter for effecting waveform equalization of an output from the sensor in accordance with a predetermined partial response characteristic; a quality evaluating circuit for measuring reproduction quality of an output signal from the equalization filter; and an adaptive equalization circuit for sequentially updating a coefficient for the equalization filter, wherein while the update of the coefficient for the equalization filter by the adaptive equalization circuit is stopped, the spherical aberration generating mechanism is driven on the basis of the reproduction quality measured by the quality evaluating circuit.

10 Claims, 11 Drawing Sheets

"CODE VALUE"/PR VALUE
PR7 VALUES, 6 STATES

OPTICAL INFORMATION RECORDING/REPRODUCING APPARATUS WITH MECHANISM FOR CORRECTING SPHERICAL ABERRATION AND METHOD USING SAME

BACKGROUND OF THE INVENTION

1. Field of the Invention

The present invention relates to an apparatus and method for recording/reproducing optical information, and in particular, to an apparatus and method for recording/reproducing optical information that corrects spherical aberration generated by an error in the thickness of a substrate of an optical recording medium, in accordance with reproduced signal quality.

2. Related Background Art

In order to record a high-definition TV, a BD (Blu-ray Disk) apparatus has in recent years been proposed which is designed to increase density and capacity compared to the prior art apparatuses. In the BD apparatus, a semiconductor laser has a shorter oscillation wavelength, and an objective used has a higher NA.

In general, in a case where there is an error with respect to a designed value for the thickness of a substrate (light-transmissive layer) of an optical disk, spherical aberration on the optical recording medium is in proportion to the fourth power of the NA of the objective and is in inverse proportion to the wavelength. It is thus known that an error in the thickness of the substrate reduces a spot quality on the optical recording medium to degrade the recording/reproducing performance. Accordingly, because a BD apparatus using a shorter wavelength and a higher NA is more likely to generate spherical aberration than DVD apparatuses or the like, the spherical aberration must be corrected, so that apparatuses that correct the spherical aberration have been proposed. Further, techniques to use a plurality of data recording surfaces, for example, two layers have also been examined, and it is also necessary to correct spherical aberration in order to condense a light spot on two layers with different cover thicknesses without spherical aberration.

A technique for correcting spherical aberration is disclosed in, for example, Japanese Patent Application Laid-Open No. 2003-233917 that detects an index such as amplitude, jitter or the like of a reproduced signal that indicates the quality of the reproduced signal to control a spherical aberration correcting element.

However, with an increase in recording density in the recent years, it is not necessarily effective in terms of the accuracy of spherical aberration corrections to use the amplitude or jitter to evaluate the quality of the reproduced signal to control the spherical aberration correcting element, and it has thus been desirable to provide an apparatus and method for recording/reproducing optical information that can easily, reliably, and accurately correct spherical aberration.

SUMMARY OF THE INVENTION

It is, therefore, an object of the present invention to provide an apparatus and method for recording/reproducing optical information that can easily, reliably, and accurately correct spherical aberration.

According to a first aspect of the present invention, there is provided an optical information recording/reproducing apparatus that condenses a light flux from a light source on an optical recording medium and effects recording/reproduction of information, comprising:

a light source;

an objective lens for condensing a light flux from the light source;

a spherical aberration generating mechanism, provided between the light source and the objective lens, for generating spherical aberration in the light flux;

a sensor for receiving light reflected by an optical recording medium and converting the light into an electric signal;

an equalization filter for effecting waveform equalization of an output from the sensor in accordance with a predetermined partial response characteristic;

a quality evaluating circuit for measuring the reproduction quality of an output signal from the equalization filter; and an adaptive equalization circuit for sequentially updating a coefficient for the equalization filter, wherein while the update of the coefficient for the equalization filter by the adaptive equalization circuit is stopped, the spherical aberration generating mechanism is driven on the basis of the reproduction quality measured by the quality evaluating circuit.

According to a second aspect of the present invention, there is provided a method for recording/reproducing optical-information that condenses a light flux from a light source on an optical recording medium and effects recording/reproduction of information, the method comprising the steps of:

receiving light from an optical recording medium and converting the light into an electric signal;

while update of a sequentially updatable coefficient for an equalization filter is stopped, effecting waveform equalization of the converted electric signal in accordance with a predetermined partial response characteristic;

measuring reproduction quality of the equalized signal; and generating an amount of spherical aberration determined on the basis of the measured reproduction quality in a light flux from a light source.

DESCRIPTION OF THE PREFERRED EMBODIMENTS

Embodiments of the present invention will be described below in detail with reference to the drawings.

Embodiment 1

An apparatus according to the present invention will be described below in detail with reference to the drawings.

Configuration of Optical System in Optical Pickup OPU 202

Figure 10:
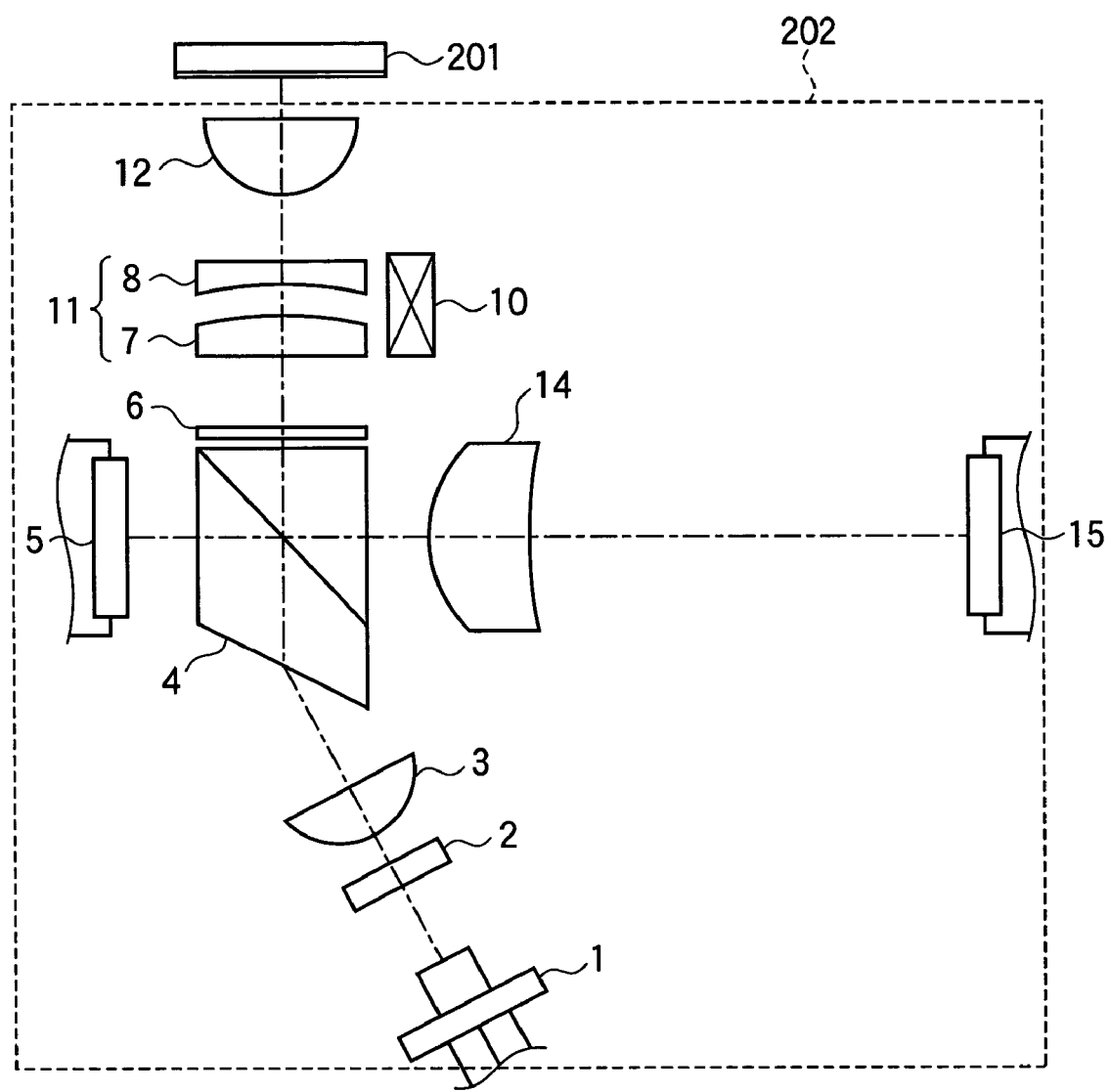
FIG. 10 is a schematic view showing the configuration of an optical system in an optical pickup OPU 202.

FIG. 10 shows an example of an optical pickup according to the present embodiment. A beam emitted by a semiconductor laser 1 is split by a diffraction grating 2 into three beams, which are then made parallel to one another by a collimator 3 and enter a beam-shaping polarizing beam splitter 4. The beams are partly reflected to enter an APC sensor 5 and utilized to monitor the quantity of light emitted by the semiconductor laser 1. The transmitted beams pass through a quarter wavelength plate 6, a lens 7, and a lens 8 and are condensed by an objective lens 12 on a surface of a recording layer of an optical disk 201 through a light-transmissive layer and utilized for reproduction/recording of information. The beams reflected by the optical disk 201 pass through the objective 12, the lens 8, the lens 7, and the quarter wavelength plate 6, are then reflected by the beam-shaping polarizing beam splitter 4 and enter an RF/servo sensor 15 via a sensor lens 14 to be utilized to reproduce an information signal.

In this case, the lens 7 is fixed, while the lens 8 is held so that an electromagnetic driving means 10 can vary the spacing between the lenses 7 and 8 in the optical axis direction, thereby constituting a spherical aberration generating means 11. The shape and glass material of the lenses 7 and 8 are selected such that only spherical aberration generates when the lens spacing varies. The electromagnetic driving means 10 uses, for example, a stepping motor to move the lens 8 on the order of micrometer using a lead-screw.

Figure 2:
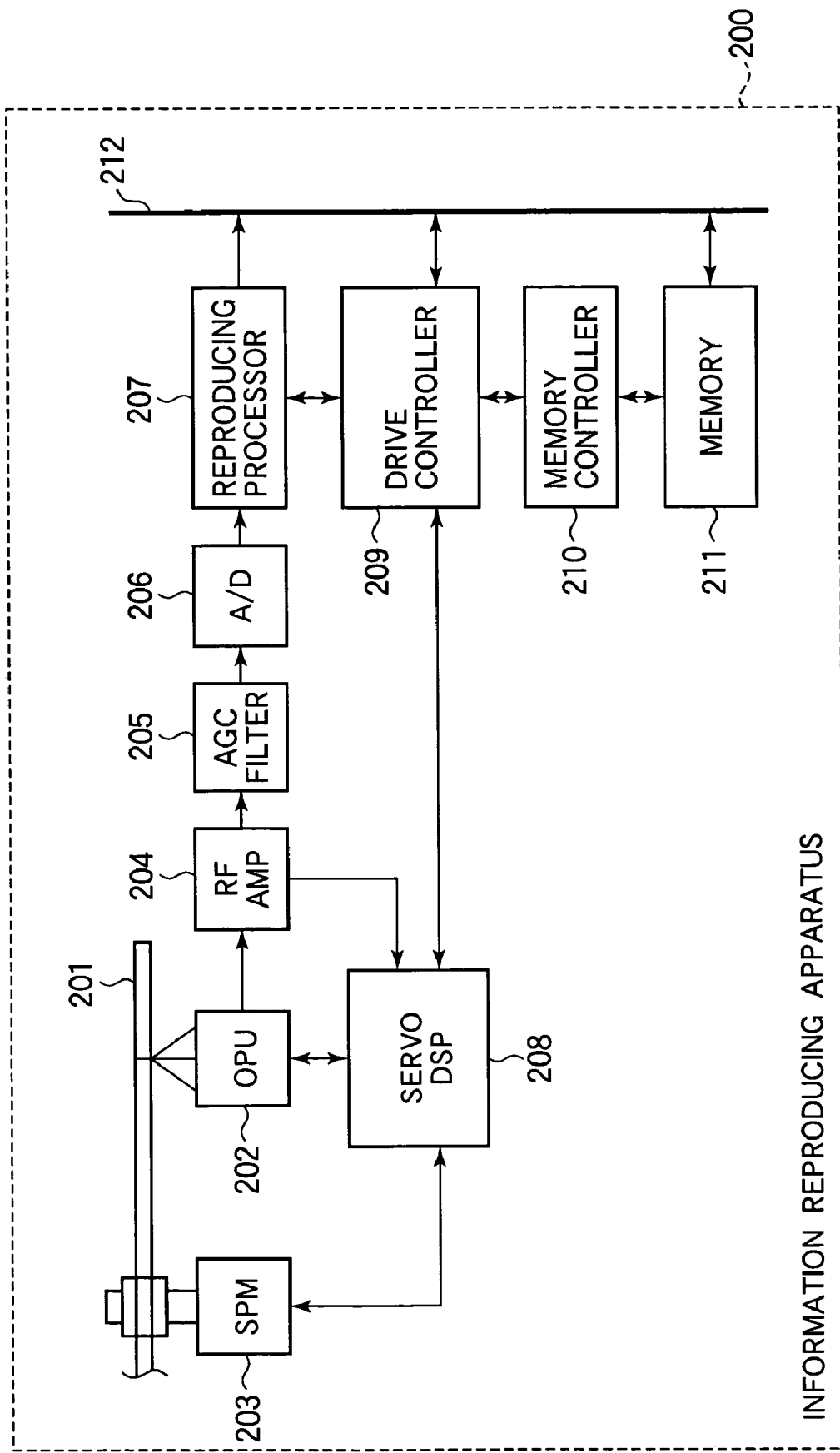
FIG. 2 is a block diagram of an information reproducing apparatus.

General Configuration of Information Reproducing Apparatus 200 and Series of Operations In FIG. 2, an information reproducing apparatus 200 is composed of a disk-like medium (hereinafter referred to as a "disk") 201, an optical pickup (OPU) 202, a spindle motor (SPM) 203, a servo DSP (Digital Signal Processor) 208, an RF preamplifier 204, an AGC (Auto Gain Control)/filter 205, an A/D converter 206, a reproducing processor 207, a drive controller 209, a memory 211, a memory control 210, and a data bus 212.

In the information reproducing apparatus 200, the memory 211 is a memory space used, via the data bus 212, by functional blocks in a time sharing manner and is controlled and managed by the memory controller 210 via the drive controller 209.

The drive controller 209 has a central processing unit (CPU), receives and executes a user specified command via the data bus 212 or executes a predetermined program to integrally control the whole system of the information processing apparatus 200.

The optical pickup 202 irradiates the disk 201 with laser light and detects information. To detect information, the optical pickup 202 detects the quantity of light reflected by the disk medium and then subjects the reflected light to photoelectric conversion to acquire a reproduced electric signal.

The servo DSP 208 has a function of controlling the whole driving control of the disk 201 and uses a traverse motor (not shown) to controllably position the optical pickup 202 on the disk 201 at a predetermined address.

Further, the servo DSP 208 controls an actuator in the optical pickup 202 to perform focus control and tracking control. Moreover, the servo DSP 208 controls the quantity of laser light emitted in the optical pickup 202 and drivingly controls the rotating speed of the disk 201 to a predetermined value.

Further, in response to an instruction from the drive controller 209, the servo DSP 208 drives the electromagnetic driving means 10 of the spherical aberration generating means 11 in the optical pickup 202 shown in FIG. 10 to provide a light flux with spherical aberration.

Description will be given of a process of reproducing information from the disk. The RF preamplifier 204 amplifies a weak reproduced signal from the optical pickup 202. Subsequently, the AGC/filter 205 controls gain to a predetermined level and executes band limitation. The A/D converter 206 converts an analog input signal into a digital signal. These components are optimally controlled by a control line (not shown) from the drive controller 209 to a predetermined characteristic. Subsequently, the reproducing processor 207 performs reproduced signal processing and then transmits the information data to the data bus 212.

Details of Functions of Reproducing Processor 207 and Series of Operations

Figure 3:
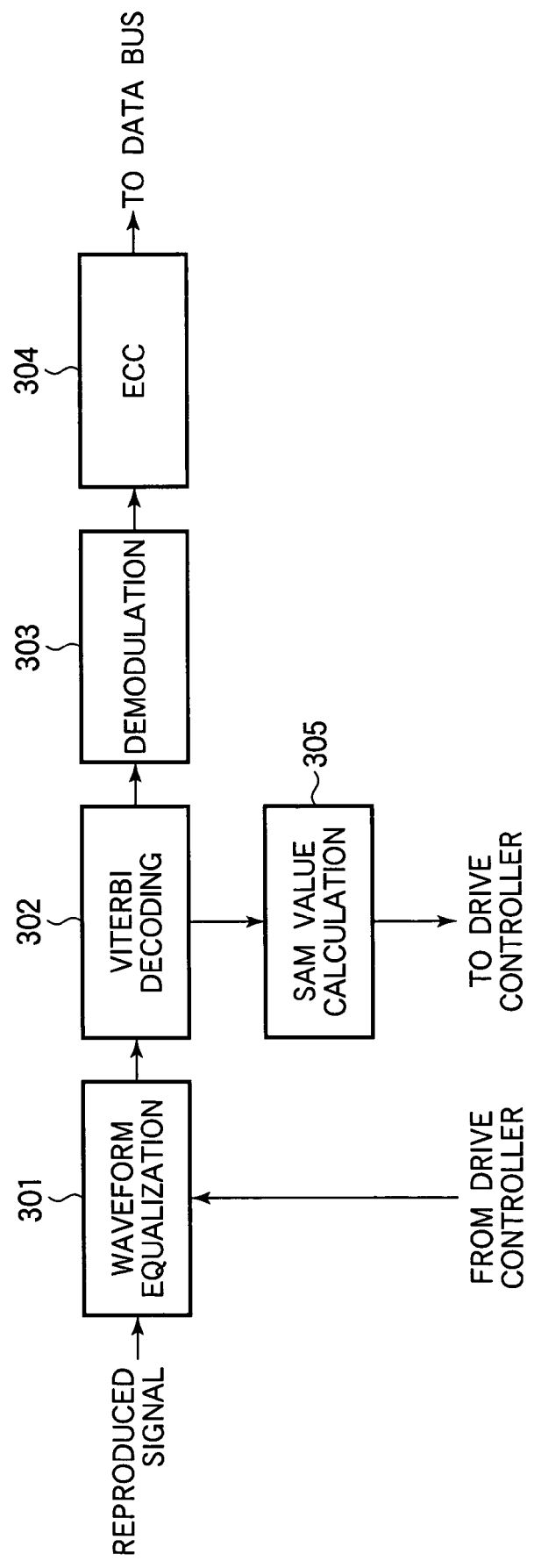
FIG. 3 is a block diagram of a reproducing processor according to Embodiment 1 of the present invention.

Now, with reference to FIG. 3, description will be given of the reproduced signal processing by the reproducing processor 207. In FIG. 3, reference numerals 301, 302 and 303 denote waveform equalization, Viterbi decoding, and demodulation, respectively. Reference numeral 304 and 305 denote an ECC (Error Correct Code) and calculation of a SAM (Sequenced Amplitude Margin) value, respectively.

A signal inputted to the reproducing processor 207 is subjected to PLL (not shown) to extract a clock component synchronizing with the reproduced signal. This clock is used for process timing for the reproducing processor.

Further, disk information shown in the present embodiment is recorded by subjecting a well-known (1, 7) RLL code to an NRZI conversion. A minimum inversion interval is 2.

The waveform equalization 301 is performed so as to have the characteristic of partial response PR (1, 2, 2, 1). The PR (1, 2, 2, 1) is expressed by the following equation:

$$y[k]=d_k+2d_{k-1}+2d_{k-2}+d_{k-3}$$

wherein y[k] is a PR output value; $d_k$ is a recording code at the current time k; $d_{k-1}$ is a recording code at a time k−1 one clock earlier than the current time; $d_{k-2}$ is a recording code at a time k−2 two clocks earlier than the current time; and $d_{k-3}$ is a recording code at a time k−3 three clocks earlier than the current time.

Figure 9:
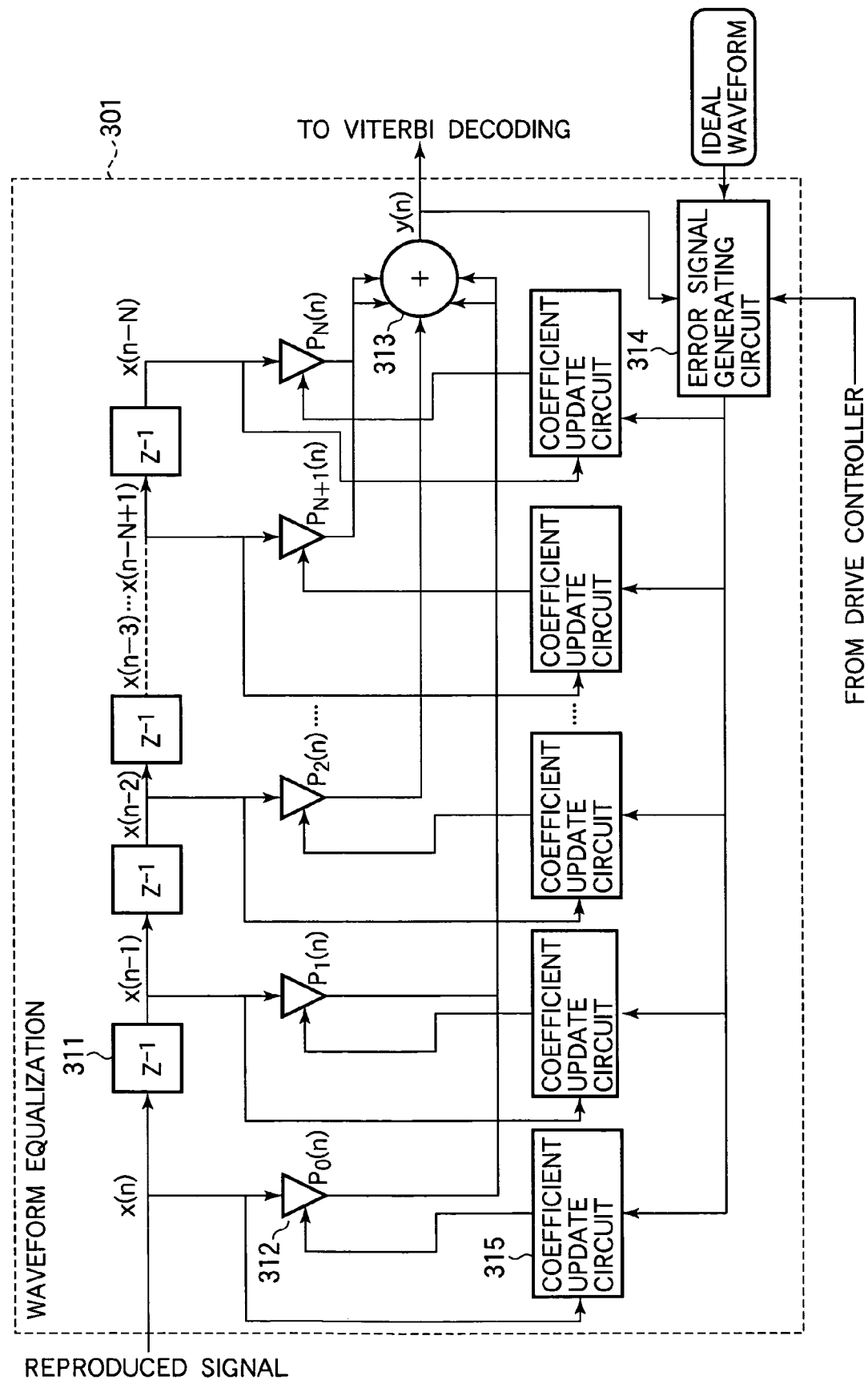
FIG. 9 is a block diagram of an adaptive equalization filter according to Embodiment 1 of the present invention.

The waveform equalization 301 is a adaptive equalization filter. FIG. 9 is a detailed block diagram of the waveform equalization 301.

In FIG. 9, the waveform equalization 301 is composed of an FIR adaptive filter with N taps; a reproduced signal x(n) is processed by N−1 delay units 311 and N coefficient multipliers 312; and an adder 313 adds outputs from the multipliers together to obtain a sum corresponding to a filter output y(n).

An adaptive operation is performed as follows.

The reproduced signal x(n) passes through the FIR type filter with the N taps to become the filter output y(n), which is then input to a Viterbi decoder and an error signal generating circuit 314. The error signal generating circuit 314 calculates a difference between an ideal waveform and the filter output y(n), multiplies the difference by a predetermined coefficient and outputs the product to a coefficient update circuit 315.

In a case where a test pattern prerecorded at a predetermined location of the disk is reproduced, because the ideal waveform is already known, the ideal waveform may be output together with the reproduced test pattern for comparison. Further, when a signal such as user data which has an unknown recorded pattern is reproduced to perform an adaptive operation, the output level of the filter is determined and the determined values are set for the ideal waveform. For example, for PR (1, 2, 2, 1) as in the case of the present embodiment, the ideal output values are seven values including 0, 1, 2, 3, 4, 5, and 6, so that the determination can be made by using a comparator that can determine the filter output level on the basis of the seven values, to simply perform level comparison.

The coefficient update circuit multiplies an output signal from the error signal generating circuit by an input signal of each coefficient multiplying circuit, then adds the product to the current coefficient to provide the next coefficient.

Continuing this operation optimizes the coefficient to make an error closer to zero, so that the adaptive operation comes to an end.

The waveform equalization 301 has a mode as to whether or not an operation of updating the coefficient (adaptive operation) should be performed and makes the adaptive operation active/inactive according to an instruction from the drive controller. While the operation is inactive, outputs from the error signal generating circuit may be set at zero regardless of the input signal.

Incidentally, the adaptive equalizer is described in, for example, Japanese Patent Application Laid-Open No. 2001-014804.

Figure 6:
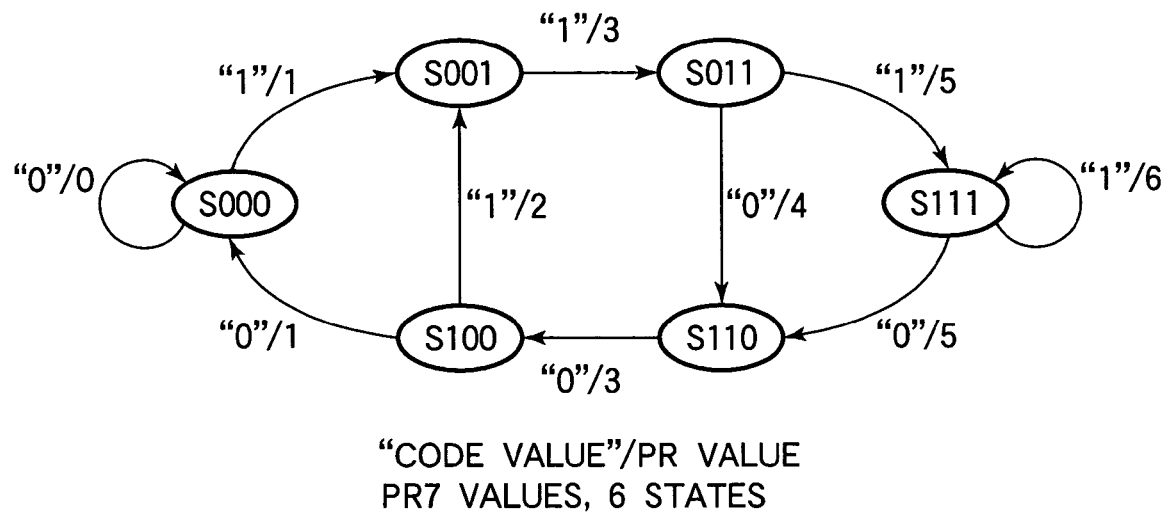
FIG. 6 is a state transition diagram.
Figure 7:
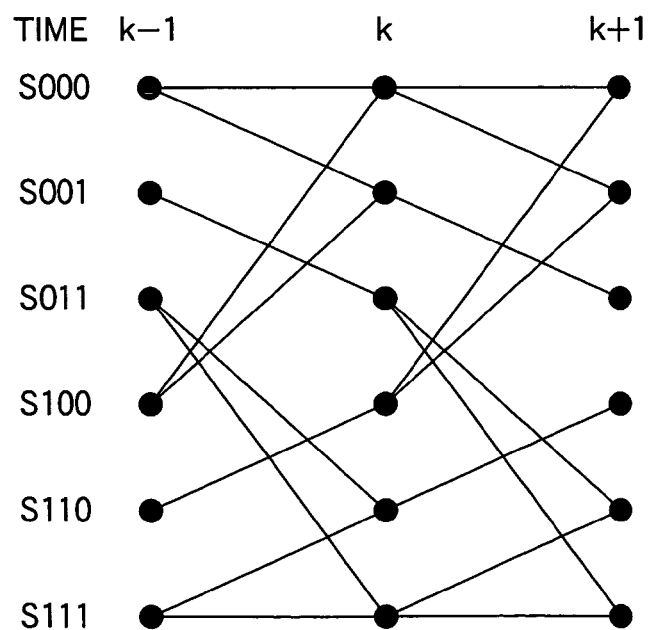
FIG. 7 is a trellis diagram.

FIG. 6 is a state transition diagram based on a (1, 7) RLL and a PR (1, 2, 2, 1). Each state shifts to the next in accordance with the PR value. Subsequently, a decode bit is output in accordance with the state transition. Further, FIG. 7 is a trellis diagram obtained by expanding the state transition diagram of FIG. 6 in the direction of a time axis.

In Viterbi decoding, on the basis of the trellis diagram shown in FIG. 7, a path metric $m_{000}[k]$ to $m_{111}[k]$ at the time k in each state are determined in accordance with Equation X, shown below, using a metric $m_{000}[k-1]$ to $m_{111}[k-1]$ at the time k−1 in a predetermined state and an actual PR output value y[k] at the time k.

Equation x $$m_{000}(k)=\min\{m_{000}(k-1)+(y-0)^2, m_{000}(k-1)+(y-1)^2\}$$

$$m_{001}(k)=\min\{m_{000}(k-1)+(y-1)^2, m_{100}(k-1)+(y-2)^2\}$$

$$m_{011}(k)=m_{001}(k-1)+(y-3)^2$$

$$m_{100}(k)=m_{110}(k-1)+(y-3)^2$$

$$m_{110}(k)=\min\{m_{111}(k-1)+(y-5)^2, m_{100}(k-1)+(y-4)^2\}$$

$$m_{111}(k)=\min\{m_{111}(k-1)+(y-6)^2, m_{011}(k-1)+(y-5)^2\}$$

In the Equation x, a state $S(d_{k-2}, d_{k-1}, d_k)$ indicates that decoded data at the current time is $d_k$, decoded data at a time that is one period earlier is $d_{k-1}$, and decoded data at a time that is two periods earlier is $d_{k-2}$.

In a state S000, a state S001, a state S110, and a state S111, two paths join at each time, so that one of the two joining paths that has a smaller path metric value is selected as a survival path. The term "path" employed herein refers to the history of state encountered until that time and is also called a state transition sequence.

Further, as shown in the trellis diagram in FIG. 7, when the state at the time k−1 is shifted to the state at the time k, the Euclidean distance between the ideal output value of the PR (1, 2, 2, 1) determined by each transition and an output value obtained by subjecting the actual reproduced signal to the PR (1, 2, 2, 1) process is used for addition as a branch metric. The ideal output value of the PR (1, 2, 2, 1) is one of the seven values including 0, 1, 2, 3, 4, 5 and 6.

Figure 8:
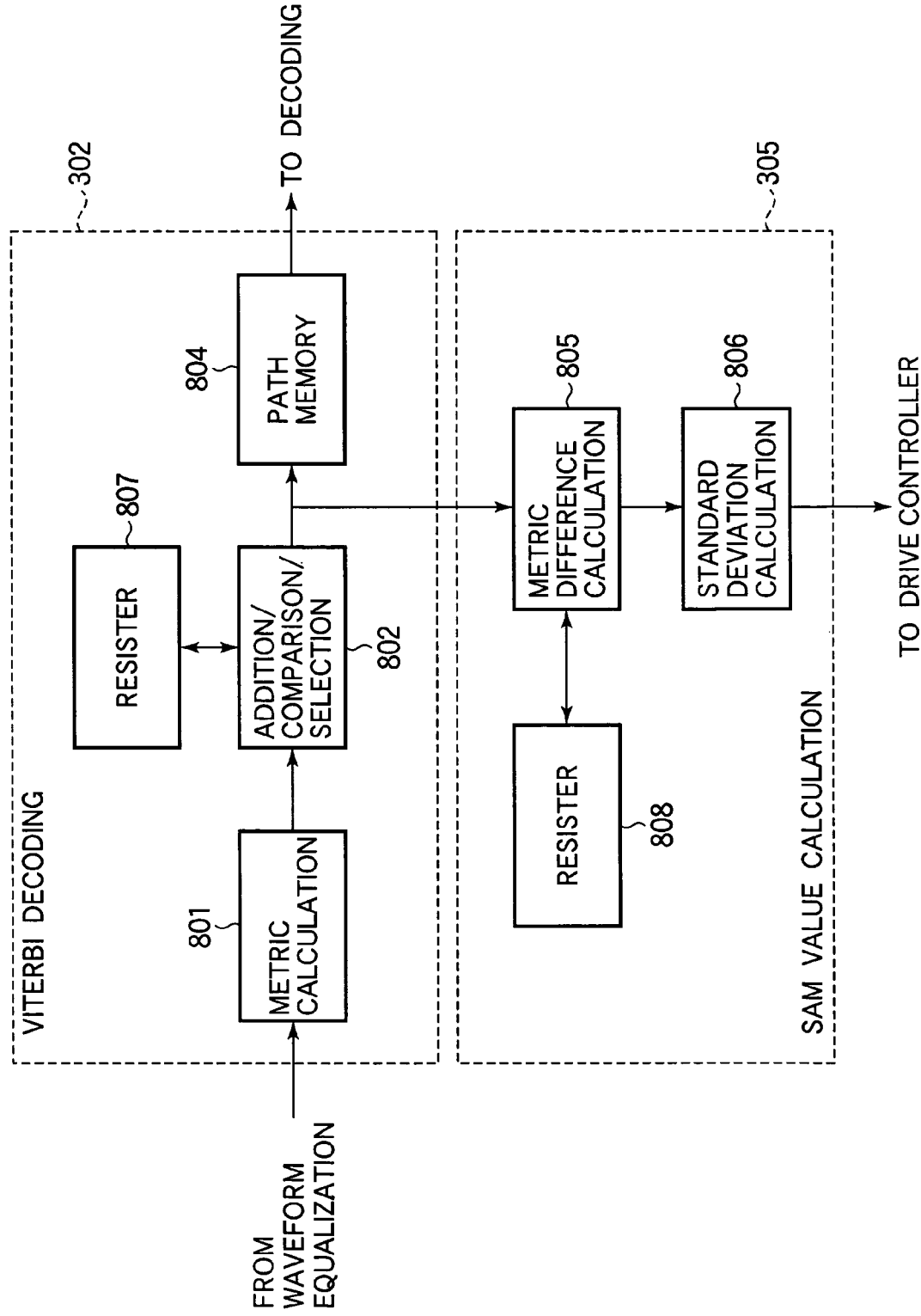
FIG. 8 is a functional block diagram of Viterbi decoding and SAM value calculation.

Now, description will be given of the Viterbi decoding 302 and the SAM value calculation 305. FIG. 8 shows the functional blocks of the Viterbi decoding 302 and SAM value calculation 305. In FIG. 8, reference numerals 801, 802, and 804 denote metric calculation, addition/comparison/selection, and a path memory, respectively. Reference numerals 805, 806, and 807 and 808 denote metric difference calculation, standard deviation calculation, and registers, respectively.

A sample value output from the PR (1, 2, 2, 1) is input to the Viterbi decoding 302. Then, the metric calculation 801 calculates a branch metric. For the branch metric, the addition/comparison/selection 802 executes the Equation x.

The branch metric input at the time k is added to the path metric value at the time k−1 in each state. The sums obtained are compared with one another to select the smallest one of them as a path metric value at the time k in each state. The new path metric value is stored in the register 807. The path memory 804 outputs the most plausible data sequence in accordance with the transition of state of the path metric value selected.

Specifically, updating the path metric value enables the calculation of plausibility of paths (state transition sequence) encountered since n periods earlier. The data sequence of the state transition sequence is output that corresponds to the smallest path metric value in a predetermined section. Thus, the data sequence corresponding to the most plausible path is output as the result of decoding.

Now, the SAM value calculation 305 will be described. The SAM (Sequenced Amplitude Margin) is the difference between the most plausible path and the second most plausible path. This is reported in, for example, Tim Perkins and Zachary A. Keirn, "A Window-Margin-Like Procedure for Evaluating PRML Channel Performance", IEEE Transaction on Magnetics, Vol. 21, No. 2, March 1995.

In FIG. 8, the metric difference calculation 805 stores the path metric difference between the most plausible path and the second most plausible path from the output results of the addition/comparison/selection 802 in a register 808.

In Viterbi decoding, the most plausible path is selected, that is, the path is selected which has the smallest accumulated error (path metric value) between the sample value of the data sequence at each time and the ideal value of the waveform equalization. Accordingly, the reliability of the Viterbi decoding and thus the decoded data increases with the increase in the metric difference between the most plausible path and the second most plausible path. In contrast, when the metric difference between the most plausible path and the second most plausible path is small, an error is likely to occur in the choice between the two paths, so that the reliability of the decoded data decreases.

Figure 4:
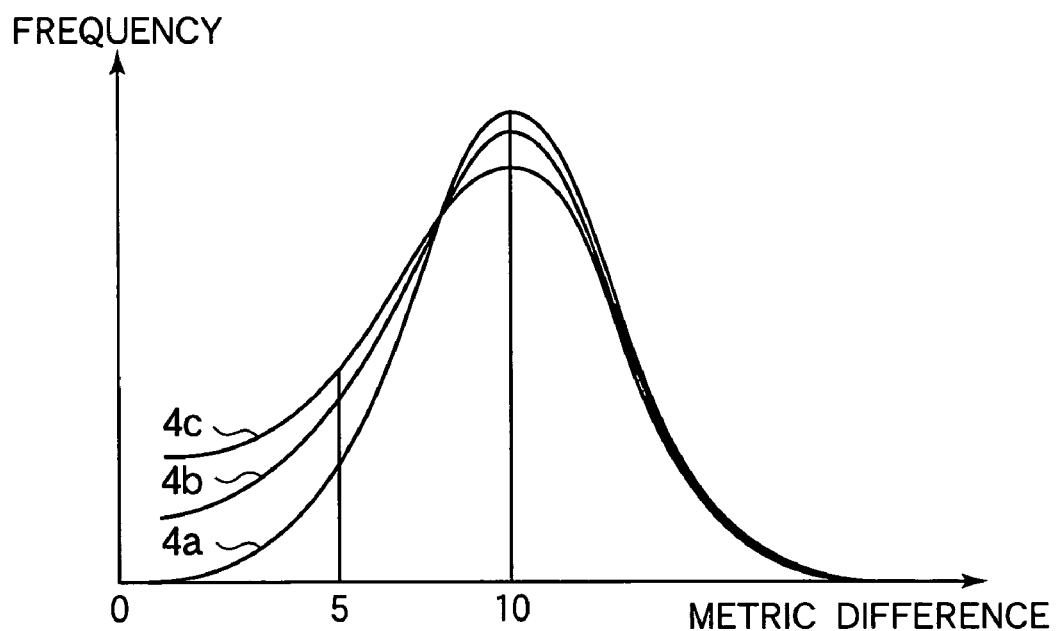
FIG. 4 is a histogram of a metric difference.

FIG. 4 shows histograms of the output values of the metric difference calculation 805. In FIG. 4, the axis of abscissa indicates the metric difference, while the axis of ordinate indicates frequency. The figure extracts and exemplifies histograms corresponding to the region of the smallest metric differences of a plurality of histograms showing the accumulation of metric differences at respective sample points. FIG. 4 shows three types of histograms involving different reproduced signal qualities. In the region of a small metric difference indicated in the axis of abscissa, the most plausible path and the second most plausible path are close to each other, so that an error in path identification in Viterbi decoding, that is, an error in decoded data is prone to occur. Accordingly, for 4a, 4b, and 4c in FIG. 4, when taking note of the frequency of the region with small metric differences, the order of 4c>4b>4a is seen, so that the reproduced signal 4c is most likely to undergo erroneous determinations in Viterbi decoding. In other words, the reproduced signal 4c has a low signal quality (grade). The reproduced signal 4b has the second lowest signal quality, and the reproduced signal 4a is most unlikely to undergo erroneous determinations, that is, has a good signal quality.

The standard deviation calculation 806 in FIG. 8 has a function for determining a standard deviation from the histograms of the metric difference shown in FIG. 4. In the example shown in FIG. 4, the standard deviation is in the order of 4c>4b>4a, and the quality of the reproduced signal can be determined on the basis of the level of the standard deviation.

Figure 5:
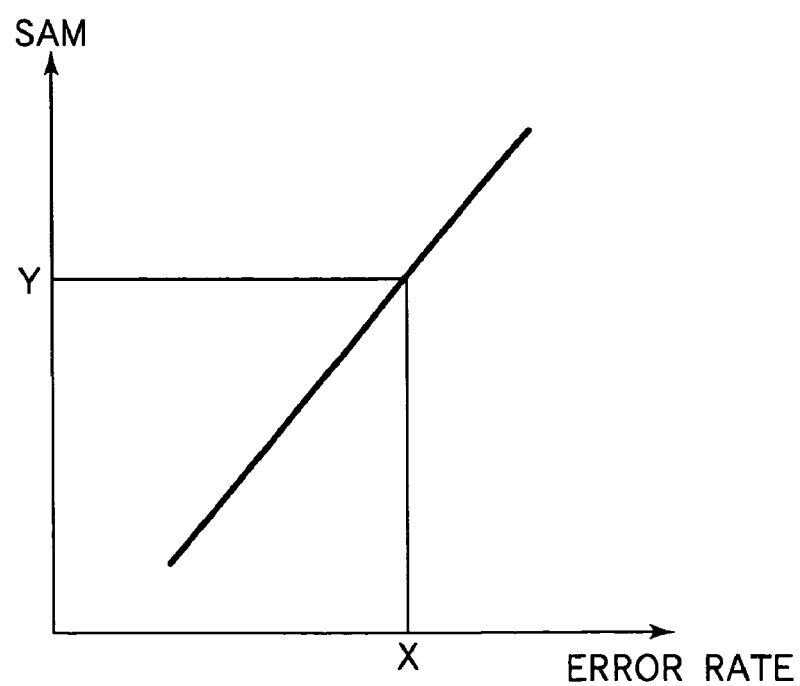
FIG. 5 is a graph showing correlation between SAM value and error rate.

FIG. 5 is a graph showing the correlations between the SAM value and an error rate (bit error rate). It is seen from the figure that the SAM value obtained from the Viterbi decoding exhibits a high correlation with the error rate.

The reproducing processor shown in FIG. 3 will be described again. The demodulation 303 is a demodulating device that subjects a decoded data sequence to (1, 7) RLL demodulation, and an information reproduced signal subjected to error correction by the subsequent ECC 304 is then output to the data bus 212.

An operational procedure according to the present embodiment will be described with reference to the flowchart in FIG. 1.

When the optical disk apparatus according to the present embodiment is activated, activation of a spindle, lightening of a laser, starting-up of a servo, and the like are executed, whereby the apparatus is thus ready to read data from the medium.

A spherical aberration correcting routine is started (step S1). First, the spherical aberration generating means 11 is set to generate a predetermined appropriate aberration (step S2). For example, when the thickness of the substrate of the medium is standard, the spherical aberration generating means is set to provide such an aberration as to eliminate spherical aberration on a surface of the medium in design value. This amount of correction for spherical aberration is defined as "0".

Then, the drive controller instructs the waveform equalization 301 to activate an adaptive operation (step S3). Thus, the waveform equalization 301 starts updating the coefficient so that the output is similar to the PR (1, 2, 2, 1) characteristic. The drive controller checks how the coefficient converges (step S4). Once the coefficient converges, the drive controller instructs the waveform equalization 301 to stop the adaptive operation (step S5). To check the convergence, it is possible not only to check the coefficient but also to wait for a period of sufficient to surely converge.

Figure 11:
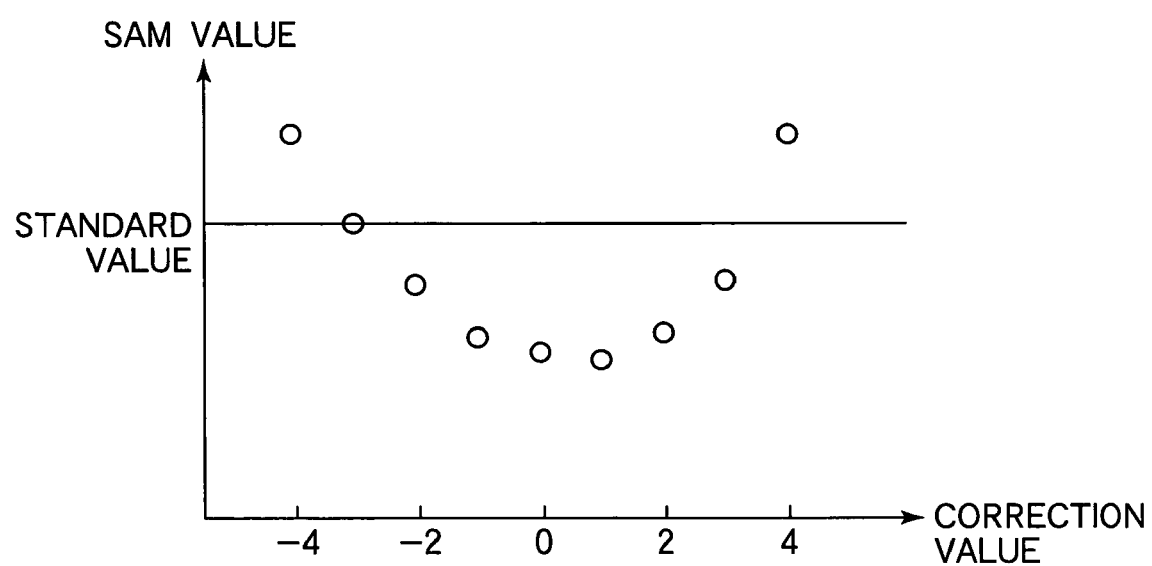
FIG. 11 is a characteristic diagram showing the relationship between amount of correction and SAM value.

Then, the amount of aberration generated by the spherical aberration generating means 11 is set at −4 (step S6). This is performed such that, for example, the lens 8 is moved by 10 μm per unit amount thereof. Specifically, the value −4 means that the lens 8 is moved by 40 μm from a reference position so as to approach the lens 7. In this state, a signal is reproduced from the medium and its SAM value is measured. The SAM value is related to the correction amount of −4 and stored in a memory of the CPU or the like (step S7). The amount of correction for spherical aberration is sequentially increased by one unit until it becomes 4 (steps S8 and S9), and the SAM value is measured and related to the correction amount and then stored. Sequentially increasing the correction amount by one unit means that the lens 8 is sequentially moved by 10 μm and the quality (grade) of the reproduced signal at each position is evaluated. FIG. 11 is a graph in which the axis of abscissa indicates the amount of correction, while the axis of ordinate indicates the SAM value. In order to determine the optimum correction amount for spherical aberration, the SAM values stored so as to be related to the correction amount are used. The correction amounts at two positions at which the SAM value exceeds or falls below a reference value (for example, the SAM value at which the bit error rate corresponds to $10^{-4}$) are determined and the median of the correction amounts at the two positions is defined as an optimum correction amount for spherical aberration. In order to accurately determine the optimum correction amount for spherical aberration from discrete correction amounts, the correction amounts at those positions corresponding to the reference value are determined from the respective correction amounts by linear interpolation or the like. In the example shown in FIG. 11, because the correction amounts corresponding to the reference value are −3.0 on the negative value side and 3.3 on the positive value side, the optimum correction amount for spherical aberration is determined to be 0.15. The thus determined correction amount is set in the spherical aberration generating means 11 (step S10). The drive controller 209 instructs the waveform equalization 301 to perform an adaptive operation (step S11). When the correction of the spherical aberration is completed (step S12), the optical disk apparatus is ready to record and reproduce user data. In response to a reproduction instruction from a higher-order apparatus, the optical disk apparatus accesses a data track to reproduce the signal and effects the waveform equalization 301 to perform an adaptive equalization operation during the reproduction of the signal, whereby a highly reliable optical disk apparatus can be provided which can reproduce high-quality signals. Further, at the beginning of the spherical aberration correcting routine, by bringing the spherical aberration generating means into a reference state and having the waveform equalization 301 perform an adaptive equalization operation to make the output similar to the PR (1, 2, 2, 1) characteristic to thereby improve the signal quality, when the spherical aberration correcting means 11 is activated to change the aberration and evaluate the SAM value, the waveform equalization 301 is in the best conditions, so that the optimum spherical aberration can be appropriately determined.

Further, because the output from the waveform equalization 301 is used for the adaptive equalization operation, a quick adaptive operation can be performed, the time required by the spherical aberration correcting routine can effectively be reduced, and the quickly responsive adaptive operation serves to maintain a high signal quality even during the reproduction of the data.

Incidentally, when the apparatus is activated, data used to evaluate a reproduced signal may be recorded in a test area preformed on the medium. In this case, by roughly adjusting the spherical aberration generating means 11 to perform a test recording so as to increase the amplitude of a track error signal when the tracking servo is in off state, subsequent fine-tuning of the spherical aberration using an evaluation index such as SAM or the like can be effectively performed.

Embodiment 2

Figure 12:
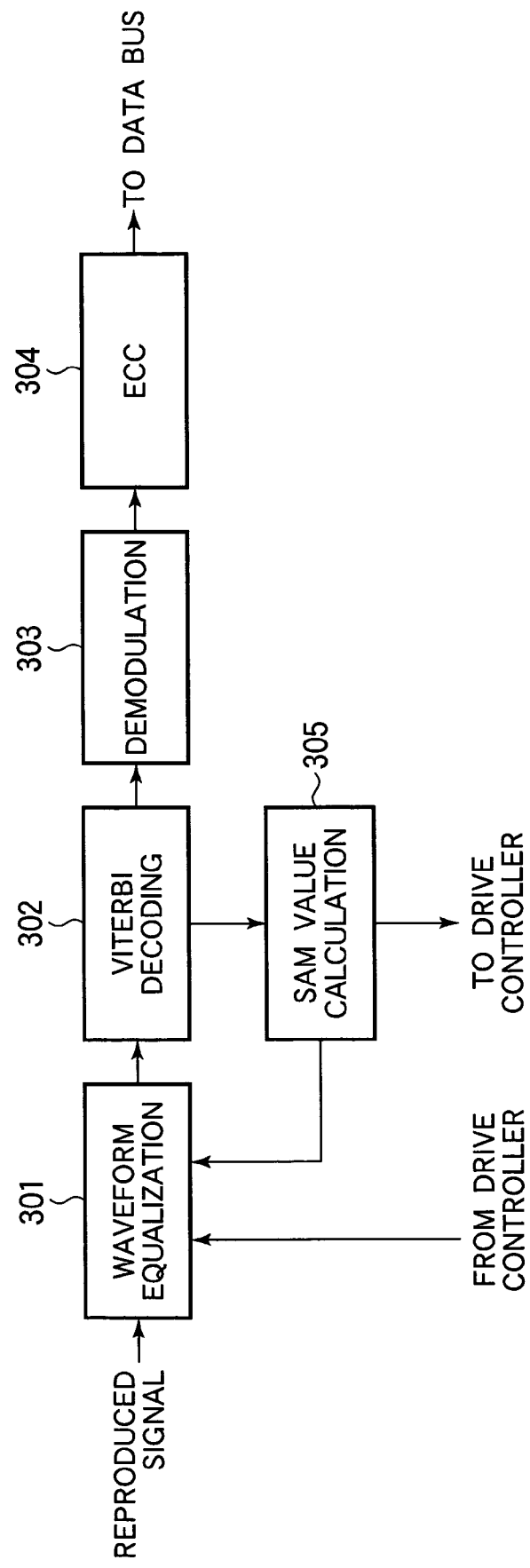
FIG. 12 is a block diagram of a reproducing processor according to Embodiment 2 of the present invention.

FIG. 12 is a block diagram of the reproducing processor 207 according to another embodiment of the present invention.

The manner in which the waveform equalization 301 performs an adaptive operation in this case is different from that shown in FIG. 3. In the present embodiment, the adaptive operation of the waveform equalization 301 is performed on the basis of the information of SAM values of a SAM calculation 305.

Figure 13:
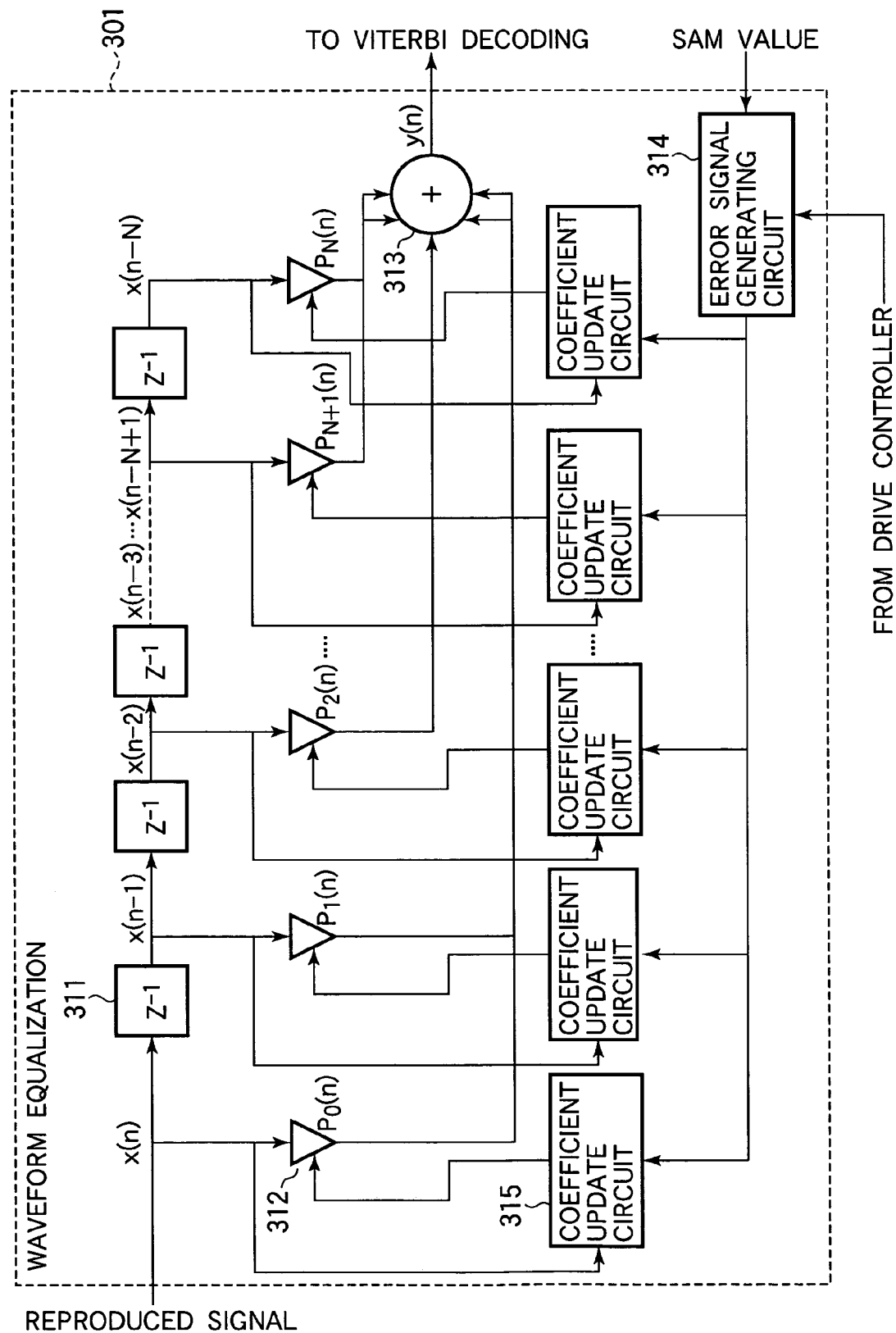
FIG. 13 is a block diagram of an adaptive equalization filter according to Embodiment 2 of the present invention.

FIG. 13 is a detailed block diagram of the waveform equalization 301 according to the present embodiment.

The SAM values are distributed with a value of 10 being a center as shown in FIG. 4. In the present embodiment, the coefficient is adjusted for the waveform equalization 301 such that the median of the SAM values is 10. For example, an error signal corresponding to (SAM value −10) is generated in an error signal generating circuit 314 shown in FIG. 13. Coefficient update circuit 315 multiplies an output signal from the error signal generating circuit 314 by an input signal of each coefficient multiplying circuit and then adds the product to the current coefficient to provide the next coefficient.

Continuing this operation optimizes the coefficient to make an error closer to zero, and the adaptive operation comes to an end.

Figure 1:
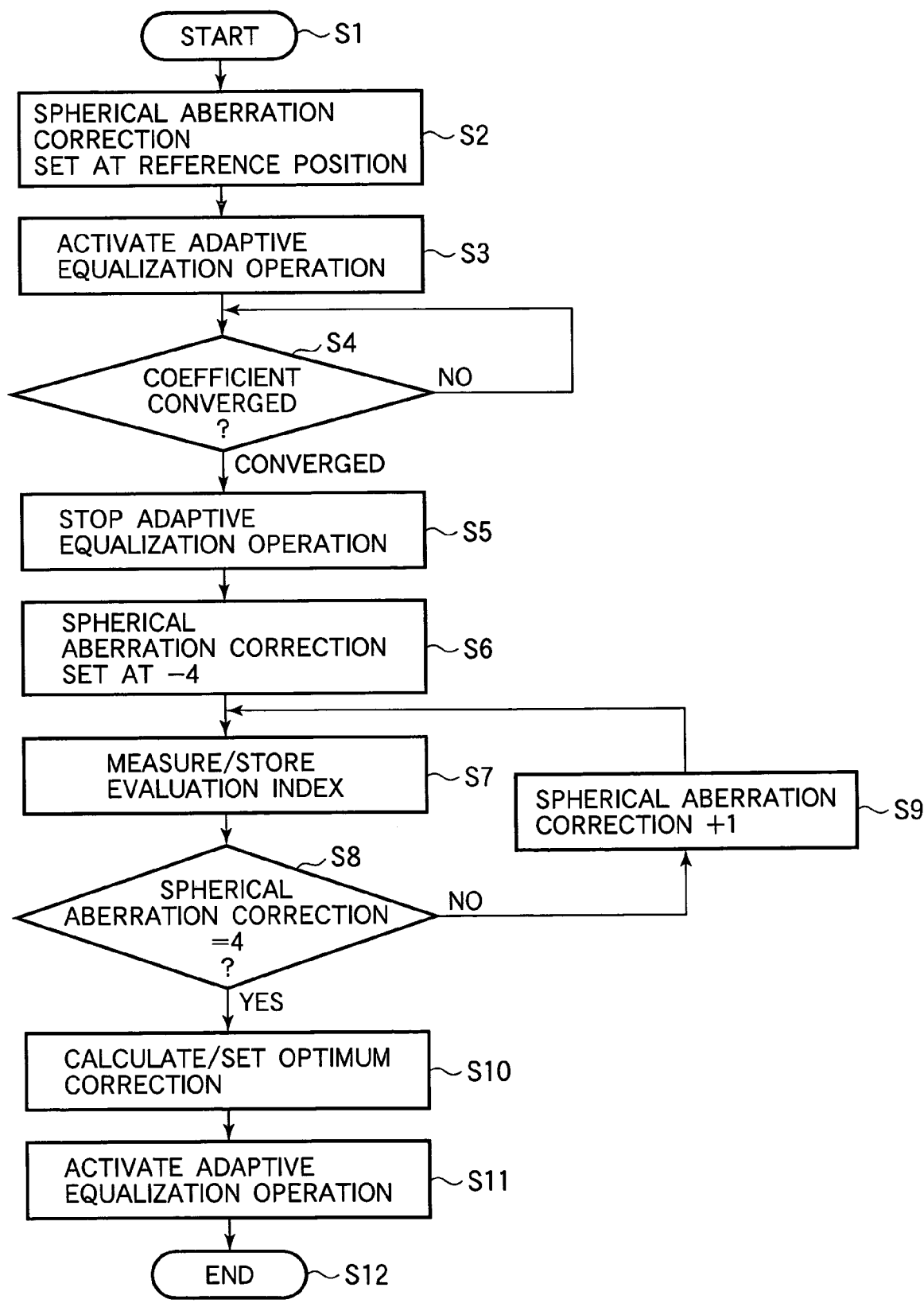
FIG. 1 is a flowchart of Embodiments 1 and 2 according to the present invention.

Also in the present embodiment, the spherical aberration correcting operation is performed in accordance with the flowchart in FIG. 1.

When the correction amount for spherical aberration is to be determined, by stopping the adaptive operation of the waveform equalization 301, and when a signal is to be reproduced, by allowing the waveform equalization 301 to perform an adaptive operation on the basis of the SAM value, the correction of the spherical aberration and the adaptive equalization operation can be carried out using, as the only evaluation index, the SAM value, which enables the signal quality (grade) to be accurately detected. This configuration also enables a more accurate adaptive equalization operation to be performed when user data is reproduced, so that even when inclination of a surface of a medium with respect to an optical pickup, i.e., the so-called tilt occurs, the reproduced signal can maintain a good quality.

This application claims priority from Japanese Patent Application No. 2003-410529 filed Dec. 9, 2003, which is hereby incorporated by reference herein.

What is claimed is:

1. An optical information recording/reproducing apparatus that condenses a light flux from a light source on an optical recording medium and effects recording/reproduction of information, comprising:
   a light source;
   an objective lens for condensing a light flux from the light source;
   a spherical aberration generating mechanism, provided between the light source and the objective lens, for generating spherical aberration in the light flux;
   a sensor for receiving light reflected by an optical recording medium and converting the light into an electric signal;
   an equalization filter for effecting waveform equalization of an output from the sensor in accordance with a predetermined partial response characteristic;
   a quality evaluating circuit for measuring reproduction quality of an output signal from the equalization filter; and
   an adaptive equalization circuit for sequentially updating a coefficient for the equalization filter,
   wherein while the update of the coefficient for the equalization filter by the adaptive equalization circuit is stopped, the spherical aberration generating mechanism is driven on the basis of the reproduction quality measured by the quality evaluating circuit.

2. The optical information recording/reproducing apparatus according to claim 1, further comprising a maximum likelihood decoding circuit that uses a maximum likelihood decoding method to binarize an output from the equalization filter, wherein the quality evaluating circuit measures the reproduction quality on the basis of a likelihood in the maximum likelihood decoding circuit.

3. The optical information recording/reproducing apparatus according to claim 1, wherein the adaptive equalization circuit updates the coefficient for the equalization filter on the basis of the output from the equalization filter.

4. The optical information recording/reproducing apparatus according to claim 2, wherein the adaptive equalization circuit updates the coefficient for the equalization filter on the basis of the measured reproduction quality.

5. The optical information recording/reproducing apparatus according to claim 1, wherein after the spherical aberration generating mechanism has been set for a predetermined set value, the adaptive equalization circuit updates the coefficient for the equalization filter, and after the coefficient for the equalization filter has converged, while the update of the coefficient for the equalization filter by the adaptive equalization circuit is stopped, the spherical aberration generating mechanism is driven on the basis of the reproduction quality measured by the quality evaluating circuit.

6. A method for recording/reproducing optical information that condenses a light flux from a light source on an optical recording medium and effects recording/reproduction of information, the method comprising the steps of:
   receiving light from an optical recording medium and converting the light into an electric signal;
   while update of a sequentially updatable coefficient for an equalization filter is stopped, effecting waveform equalization of the converted electric signal in accordance with a predetermined partial response characteristic;
   measuring reproduction quality of the equalized signal; and
   generating an amount of spherical aberration determined on the basis of the measured reproduction quality in a light flux from a light source.

7. The method according to claim 6, wherein in the step of measuring the reproduction quality, the reproduction quality is measured on the basis of a likelihood calculated when an output from the equalization filter is binarized using a maximum likelihood decoding method.

8. The method according to claim 6, wherein the equalization filter updates the coefficient on the basis of a result of comparison of an output waveform of the equalization filter with an ideal output waveform.

9. The method according to claim 7, wherein the equalization filter updates the coefficient on the basis of the measured reproduction quality.

10. The method according to claim 6, wherein after the amount of spherical aberration has been set at a predetermined set value, the coefficient for the equalization filter is updated, and after the coefficient for the equalization filter has converged, the step of generating spherical aberration is executed on the basis of the measured reproduction quality, while the update of the coefficient for the equalization filter is stopped.

* * * * *